US012732388B2

(12) United States Patent
Mamadapur

(10) Patent No.: US 12,732,388 B2
(45) Date of Patent: Sep. 8, 2026

(54) NON-FUNGIBLE TOKEN (NFT) BASED INTELLIGENT DOCUMENT PROTOCOLS

(71) Applicant: Bank of America Corporation, Charlotte, NC (US)

(72) Inventor: Krishna Rangarao Mamadapur, Maharashtra (IN)

(73) Assignee: Bank of America Corporation, Charlotte, NC (US)

(*) Notice: Subject to any disclaimer, the term of this patent is extended or adjusted under 35 U.S.C. 154(b) by 544 days.

(21) Appl. No.: 18/138,844

(22) Filed: Apr. 25, 2023

(65) Prior Publication Data

US 2024/0364544 A1 Oct. 31, 2024

(51) Int. Cl.
*H04L 9/00* (2022.01)
*H04L 9/08* (2006.01)

(52) U.S. Cl.
CPC .............. *H04L 9/50* (2022.05); *H04L 9/0819* (2013.01)

(58) Field of Classification Search
CPC ................................ H04L 9/50; H04L 9/0819
See application file for complete search history.

(56) References Cited

U.S. PATENT DOCUMENTS

2019/0229890 A1* 7/2019 Brehmer ................. H04L 9/088
2019/0356493 A1* 11/2019 Fisher ................... H04L 63/102
2020/0117818 A1* 4/2020 Latka .................. H04L 67/1097
2021/0182423 A1* 6/2021 Padmanabhan ....... H04L 9/3271
2022/0277275 A1* 9/2022 Housser ............... G06Q 20/389
2023/0177490 A1* 6/2023 Moore ............... G06Q 20/3823 705/66
2023/0222490 A1* 7/2023 Meyers ..................... H04L 9/50 705/66
2023/0308276 A1* 9/2023 Bathen ..................... G09C 5/00
2024/0171414 A1* 5/2024 Johnson .................... H04L 9/50
2024/0241976 A1* 7/2024 Lebowitz ................ G06F 21/64
2024/0265223 A1* 8/2024 Binder ...................... H04L 9/50
2025/0156948 A1* 5/2025 Smith .................... G06Q 40/04

FOREIGN PATENT DOCUMENTS

NL 2029246 B1 * 8/2022 ......... G06Q 20/1235
WO WO-2024043950 A1 * 2/2024 ............ G06F 21/64

* cited by examiner

*Primary Examiner* — Jung W Kim
*Assistant Examiner* — James P Moles
(74) *Attorney, Agent, or Firm* — Weiss & Arons LLP

(57) ABSTRACT

Systems, methods, and apparatus are provided for NFT-based self-actuating document management. A private blockchain network may capture a document and a set of rules associated with the document. The network may mint an NFT that embeds the digitized document. The document rules may be encoded in self-actuating NFT metadata. The NFT may be encrypted using multiple layers of encryption prior to blockchain storage. The blockchain network may transmit a token identifier to the document owner.

19 Claims, 6 Drawing Sheets

NON-FUNGIBLE TOKEN (NFT) BASED INTELLIGENT DOCUMENT PROTOCOLS

FIELD OF TECHNOLOGY

Aspects of the disclosure relate to NFTs minted on a private blockchain.

BACKGROUND OF THE DISCLOSURE

Managing sensitive document content across an enterprise involves significant technical and logistical challenges. Some of the areas involved include encryption, secure storage, employee entitlements, and compliance regulations, among others. A comprehensive management approach may involve multiple disparate applications in combination with manual oversight and may require a significant investment of resources.

Non-fungible tokens (NFTs) are digitally unique identifiers that may be used to mark a piece of digital data. NFTs may be trackable using a distributed ledger such as a blockchain. NFTs may be minted through smart contracts that assign ownership and manage transferability.

It would be desirable to use NFT features for secure and confidential document management that is centralized, comprehensive, adaptable, and self-actuating.

SUMMARY OF THE DISCLOSURE

Systems, methods, and apparatus are provided for NFT-based intelligent document management protocols.

A private blockchain network may capture a document and a set of rules associated with the document. The rules may include a purge date, an entitlement criterion, a set of redaction requirements, or any suitable rules. The redaction requirements may be linked to the entitlement criterion. The document and the document rules may be parsed and converted to a digital format.

The blockchain network may mint an NFT that embeds the digitized document and the document rules. The document rules may be encoded in self-actuating NFT metadata.

The NET content and metadata may be encrypted using multiple layers of symmetric and asymmetric encryption. The blockchain network may store the NFT by generating a unique hash based in part on the position of the NFT in the chain. The blockchain network may transmit a unique token identifier to the document owner.

The invention is a practical application that involves self-actuating document protocols embedded in NFT metadata. A user interface may receive input selecting, modifying, or adding document rules along with a request to mint the NFT. The NFT may be protected using multiple layers of encryption at different levels of a private blockchain for secure document storage.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
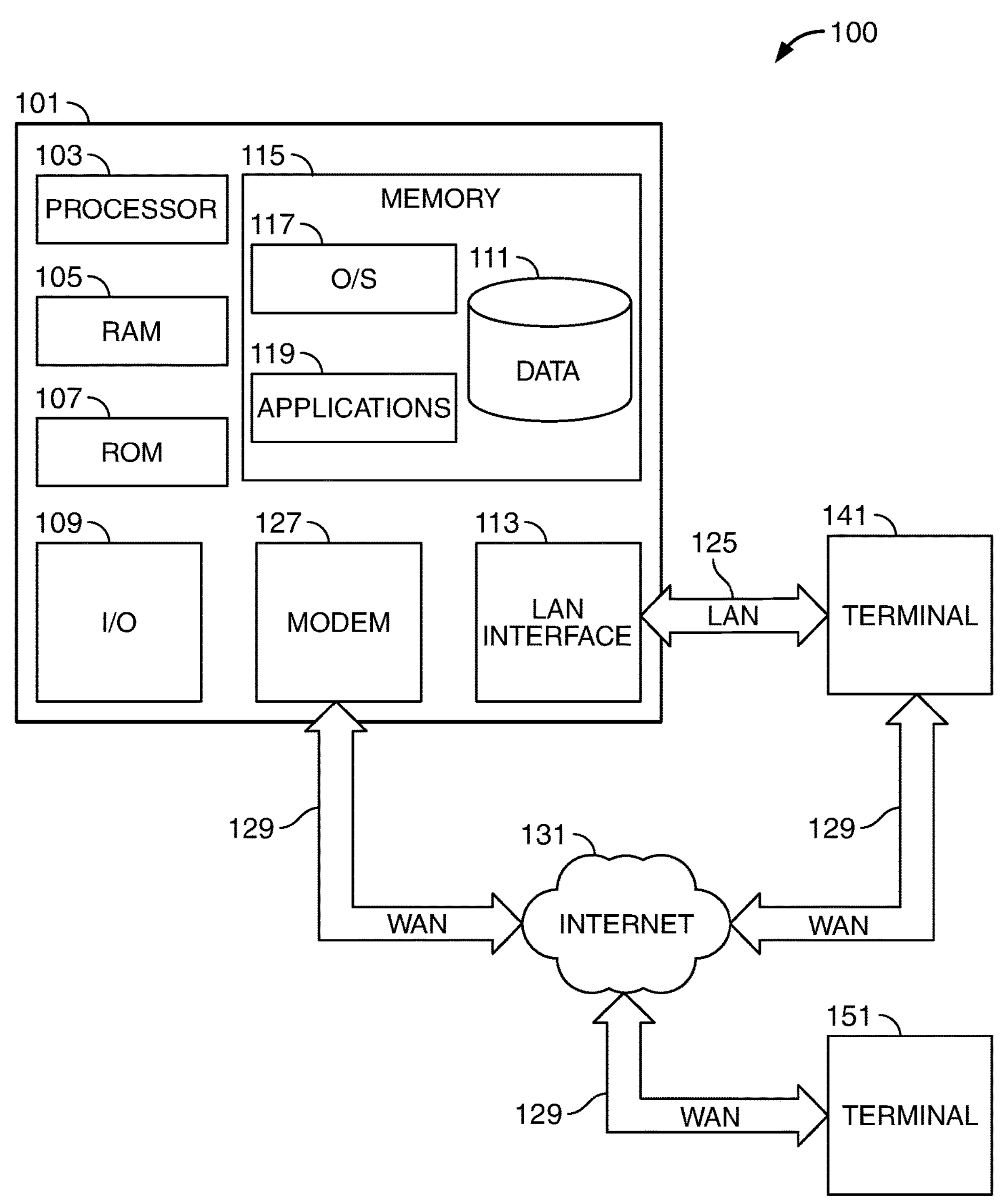
FIG. 1 shows illustrative apparatus in accordance with principles of the disclosure.

Systems, methods, and apparatus are provided for NFT-based intelligent document management protocols.

For the sake of illustration, the invention will be described as being performed by a "system." The system may include one or more features of apparatus and methods that are described herein and/or any other suitable device or approach.

The system may include a private blockchain. A blockchain is a distributed ledger of records which contain information. Records stored in a blockchain are organized in blocks. Each block may include multiple records. The blocks are linked to one another and secured using cryptography.

The private blockchain may be a permissioned blockchain that operates in a closed network. A private blockchain is typically used within an enterprise for internal storage.

The system may define document rules. The document rules may include any suitable document management parameters. The document rules may include a purge date. The purge date may specify a date on which the document will be deleted from the system.

The document rules may include entitlement rules. The entitlement rules may define the credentials required for access to the document. The entitlement rules may process access to the document in response to receiving user credentials.

The document rules may include redaction rules for masking sensitive data elements in the document. For example, the document rules may redact a customer social security number included in a document. A specific set of redactions may be associated with a user entitlement level.

The system may mint an NFT. An NFT includes software code in a smart contract format. The smart contract may encode details of the underlying asset and the rights that attach to an NFT. The smart contract may conform to ERC-721 or any suitable standard.

The system may embed the document in an NFT. The smart contract logic of the NFT may incorporate the document rules. The rules may be self-actuating.

The system may include a user interface. The user interface may be accessed using a web browser, computer application, mobile application or by any suitable method. The user interface may include text, graphics, or any suitable elements.

The user interface may enable a user to select from a predetermined set of document rules. For example, a user may select one or more levels of entitlement having ability to access the document. A user may select one or more categories of sensitive information that will be redacted for each level of entitlement. A user may select a date on which the document will be automatically removed from the system. In some embodiments, the user may input new rules or modify existing rules instead of selecting from a set of options.

The system may capture the document and the document rules. The document and the rules may be parsed and converted to a digital format. The system may mint an NFT using any suitable smart contract logic. The NFT metadata may include the document rules. The system may return a unique token that is associated with the document and the metadata.

The system may store the NFT on a private enterprise blockchain. The system may encrypt the document. The system may encrypt the NFT metadata. In some embodiments, the metadata encoding the document rules may be encrypted separately from the digitized document. In some embodiments, the metadata may be encrypted using a different form of encryption from the document.

The system may use asymmetric encryption such as public key cryptography. Public key cryptography relies on a pair of public and private keys. Public key cryptography may enable two servers to communicate in a secure manner.

The system may rely on public key cryptography to validate a digital signature. A digital signature uses a mathematical algorithm to generate a digital code that establishes the legitimacy of digital messages and documents. The digital signature may be produced and substantiated by public key encryption.

The system may use a symmetric encryption algorithm such as Advanced Encryption Standard (AES). In some embodiments, the system may use multiple layers of encryption. In some embodiments, the system may use both asymmetric and symmetric forms of cryptography.

The system may store the NFT on a private blockchain. The system may use cryptographic hashing to generate a unique NFT identifier and secure the data on the blockchain. A block header may be present in the hash of the previous block to verify that nothing has been disturbed when new blocks are added. In some embodiments, the NFT metadata may be stored in a separate block or a separate blockchain.

The cryptographic hash of a block may be a function of the hash of the previous block and the parameters of the task performed by the NFT block. The hash may be represented by equation 1 below:

$$HASH_n = \beta(HASH_{n-1}, Parameters_n) \quad \text{Equation 1:}$$

In equation 1, $HASH_n$ is the hash of the nth block, $\beta$ is any suitable cryptographic hash function, $HASH_{n-1}$ is a hash of the previous block, and $Parameters_n$ are the parameters of the tasks performed by the current block.

One or more non-transitory computer-readable media storing computer-executable instructions are provided. When executed by a processor on a computer system, the instructions perform a method for NFT-based intelligent document management.

The method may include, at a private blockchain network, capturing a document and a set of rules associated with the document.

The method may include converting the document to a digital format and minting an NFT that includes the digitized document and document rules. The document rules may be encoded in self-actuating NFT metadata.

The method may include encrypting the NFT and the NFT metadata using public/private key encryption. The method may include storing the encrypted NFT in the blockchain. Storing the NFT may involve generating a unique hash for the NFT and NFT metadata based on the position of the NFT in the blockchain.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods. Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or flash memory or any other suitable components, may also be part of the computer 101.

Memory 115 may be comprised of any suitable permanent storage technology, such as a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. The computer executable instructions may be embodied in hardware or firmware (not shown). Application program(s) 119 may utilize one or more algorithms that process received executable instructions, perform power management routines or other suitable tasks. Application program(s) 119 may utilize one or more decisioning processes for the generation of NFTs as detailed herein.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
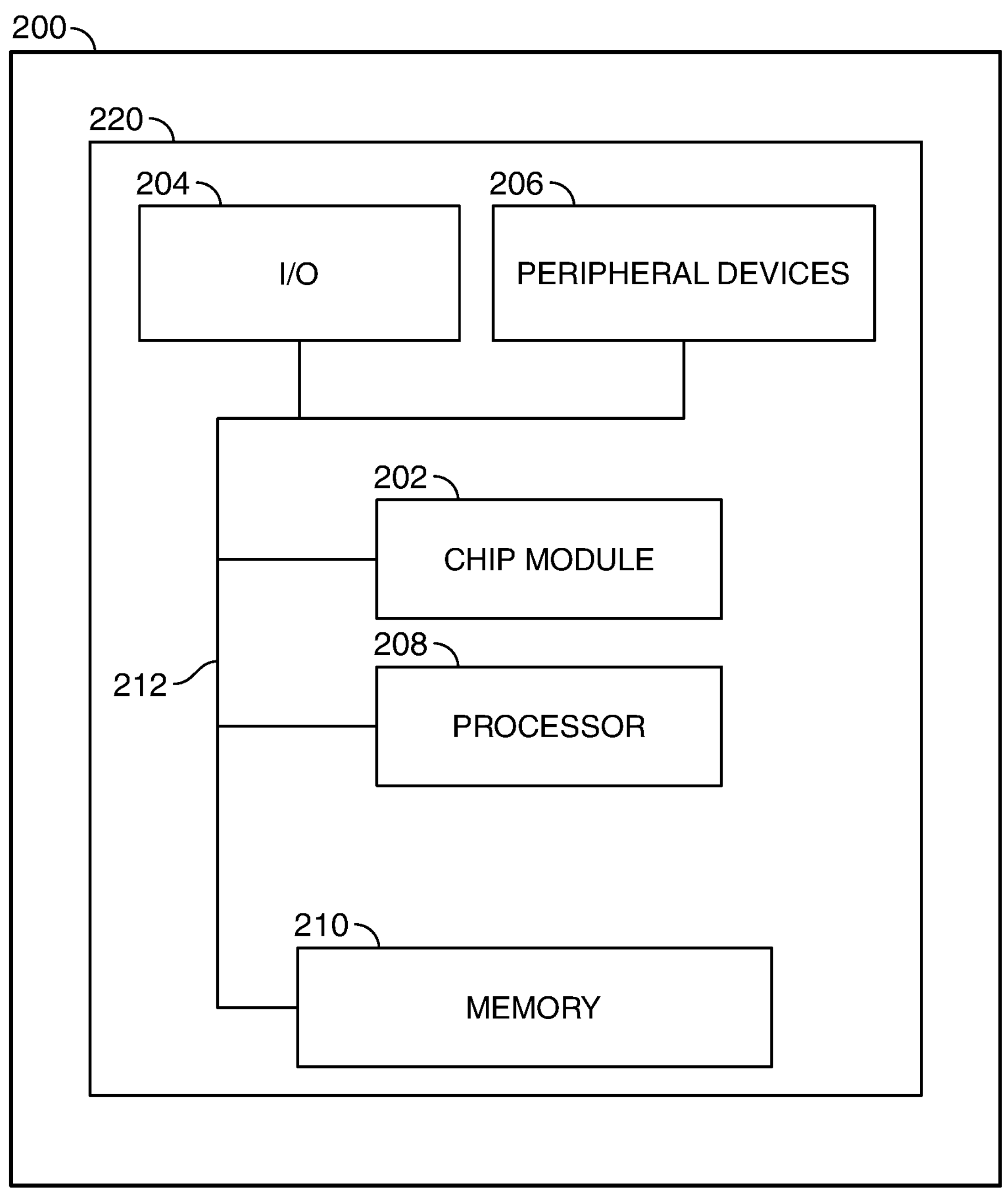
FIG. 2 shows illustrative apparatus in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3:
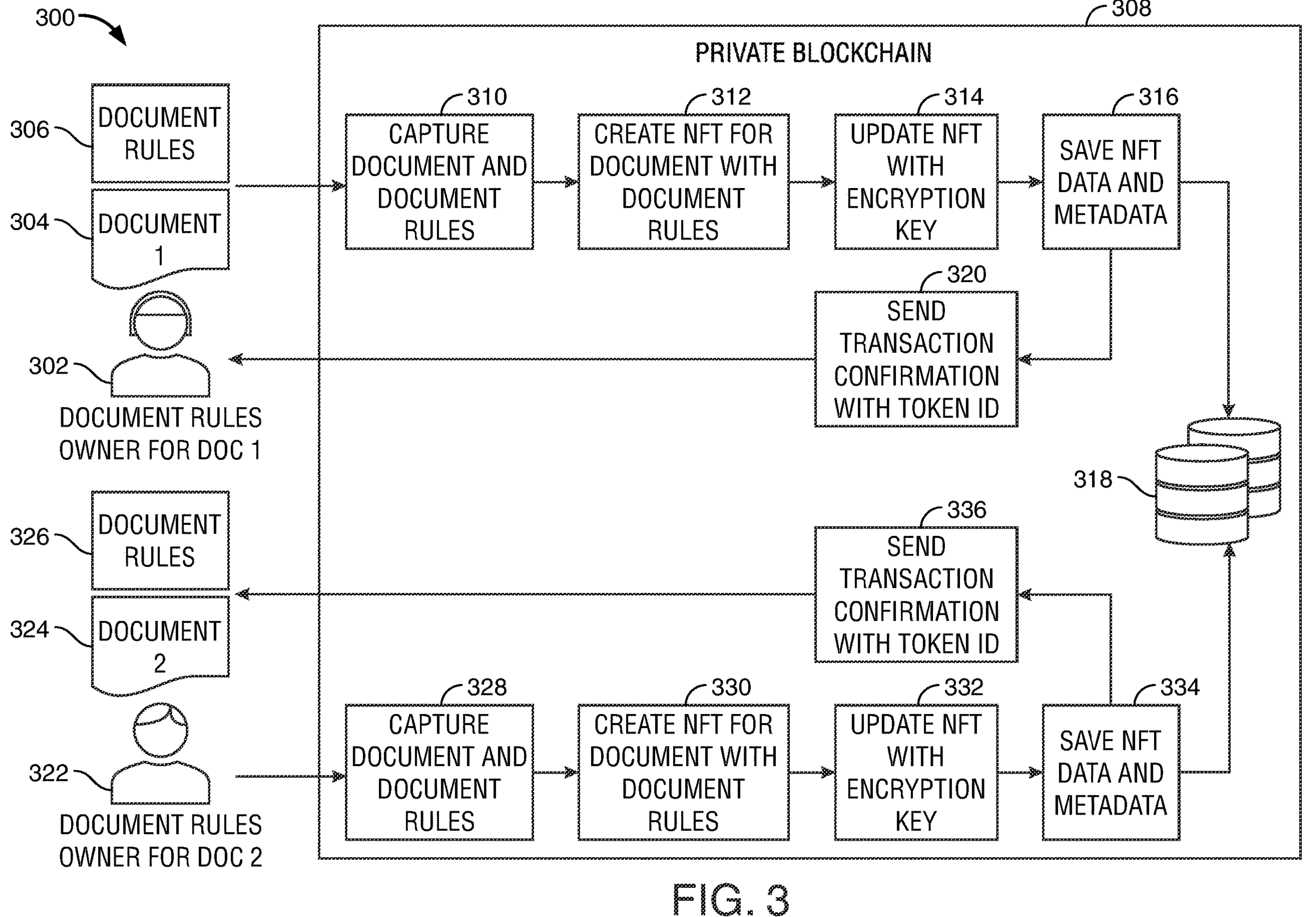
FIG. 3 shows an illustrative process flow in accordance with principles of the disclosure.

FIG. 3 shows illustrative process flow 300 for NFT-based document management protocols. User 302 may be the owner of document 304. The user may specify document management rules 306 associated with document 306. A user interface may include selectable options for document rules. The user interface may enable the user to modify rules or input new rules.

The user interface may enable the user to upload the document to private blockchain system 308. At 310, the system may capture and parse document 304 and document rules 306. At 312, the system may mint an NFT for the document and the document rules. At 314, the system may use public/private key encryption to secure the NFT. At 316, the system may store the NFT data and metadata in database 318. At 320, the system may send a transaction confirmation and token identifier to user 302.

User 322 may be the owner of document 324. The user may specify document management rules 326 associated with the document. A user interface may include selectable options for the document rules. The user interface may enable the user to modify rules or input new rules.

The user interface may enable the user to upload the document to private blockchain system 308. At 328, the system may capture and parse document 324 and document rules 326. At 330, the system may mint an NFT for the document and the document rules. At 332, the system may use public/private key encryption to secure the NFT. At 334, the system may store the NFT data and metadata in database 318. At 336, the system may send a transaction confirmation and token identifier to user 322.

Figure 4:
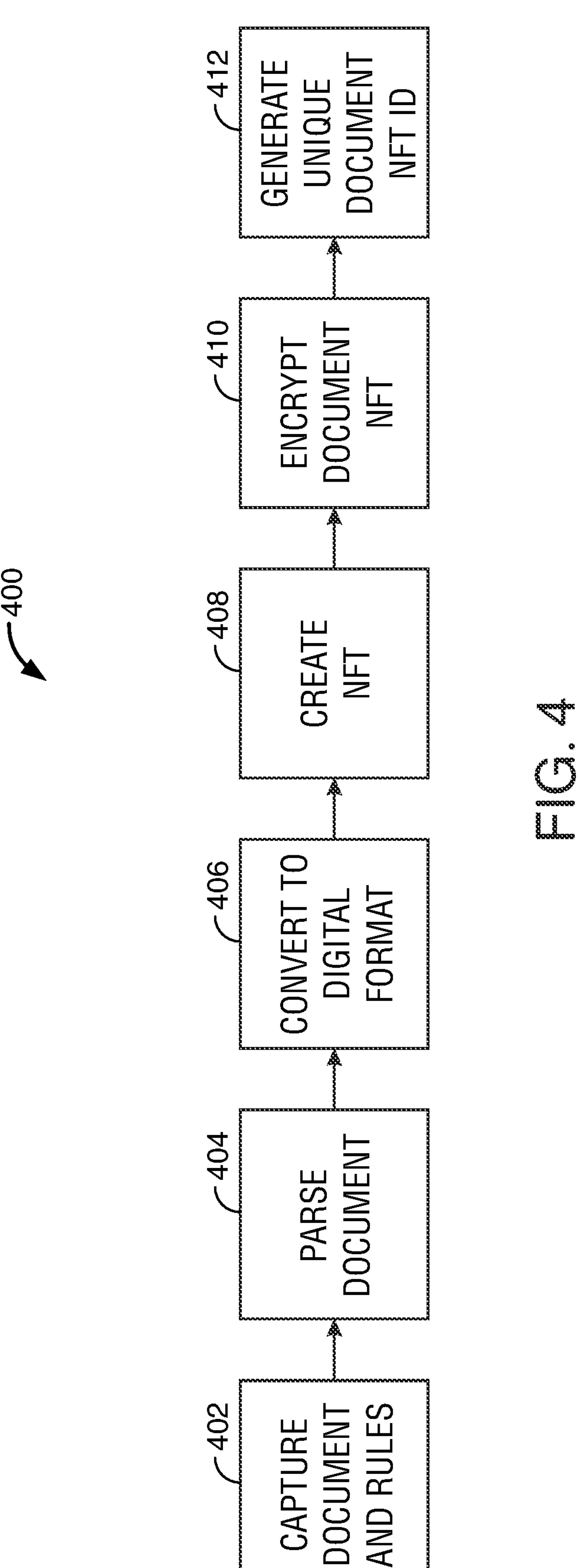
FIG. 4 shows an illustrative process flow in accordance with principles of the disclosure.

FIG. 4 shows illustrative process flow 400 for NFT-based encoding of self-actuating document rules. At 402, the system may capture the document and document management rules. At 404, the system may parse the document and the rules. At 406, the system may convert the document content and the document management rules to a digital format.

At 408, the system may mint an NFT using any suitable smart contract logic. The digital document may be embedded in the NFT. At 410, the document NFT may be encrypted. At 412, the system may generate a unique identifier associated with the NFT.

Figure 5:
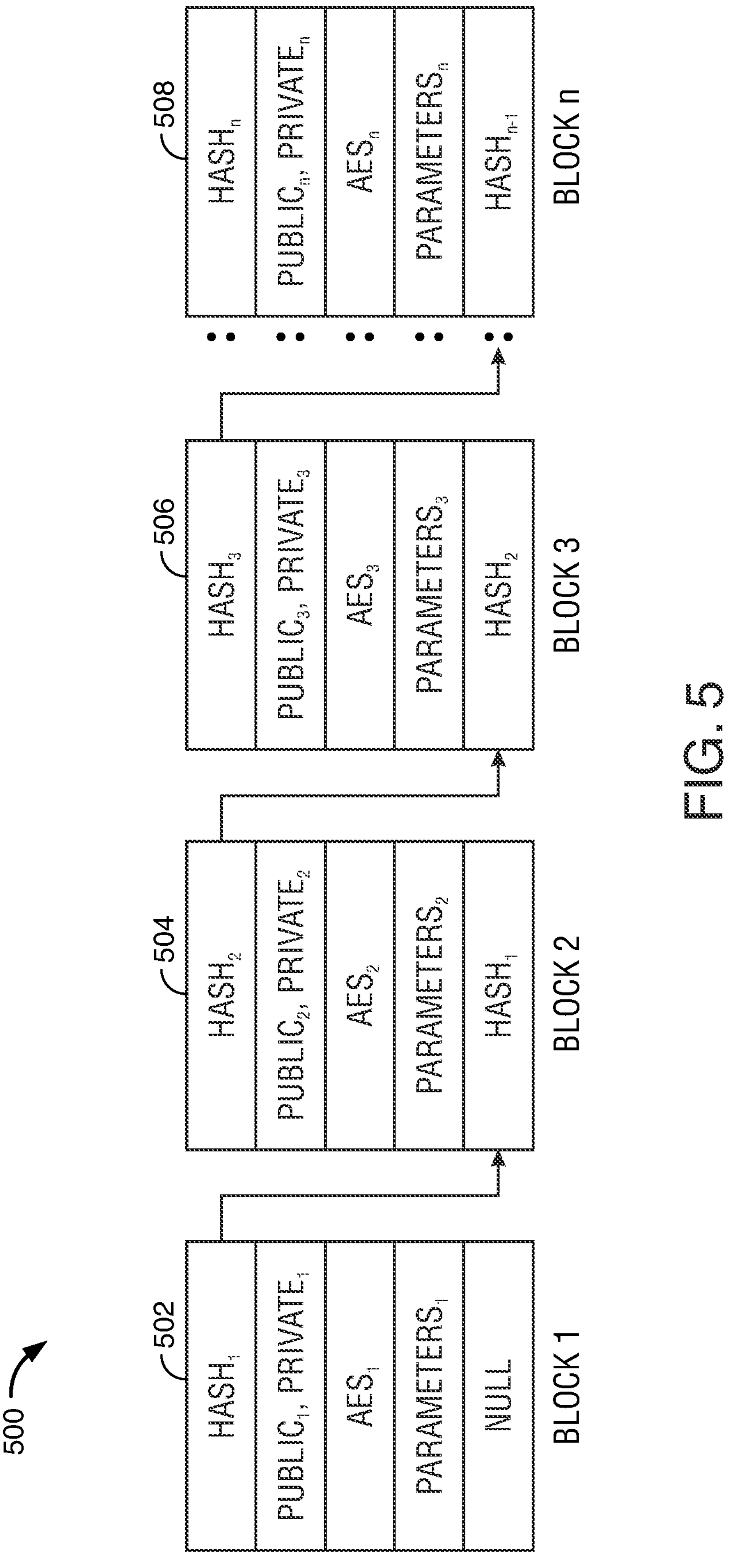
FIG. 5 shows illustrative architecture in accordance with principles of the disclosure.

FIG. 5 shows architecture 500, which includes a combination of blockchain storage with encrypted document NFTs. Blocks 502, 504, 506, and 508 each include a hash associated with the block, the public key or private key for the block, an advanced encryption standard key for the block, parameters required to complete the processing step, and a hash associated with the previous block. Block 502 is the beginning of the chain so there is no previous block and therefore no hash associated with a previous block.

Figure 6:
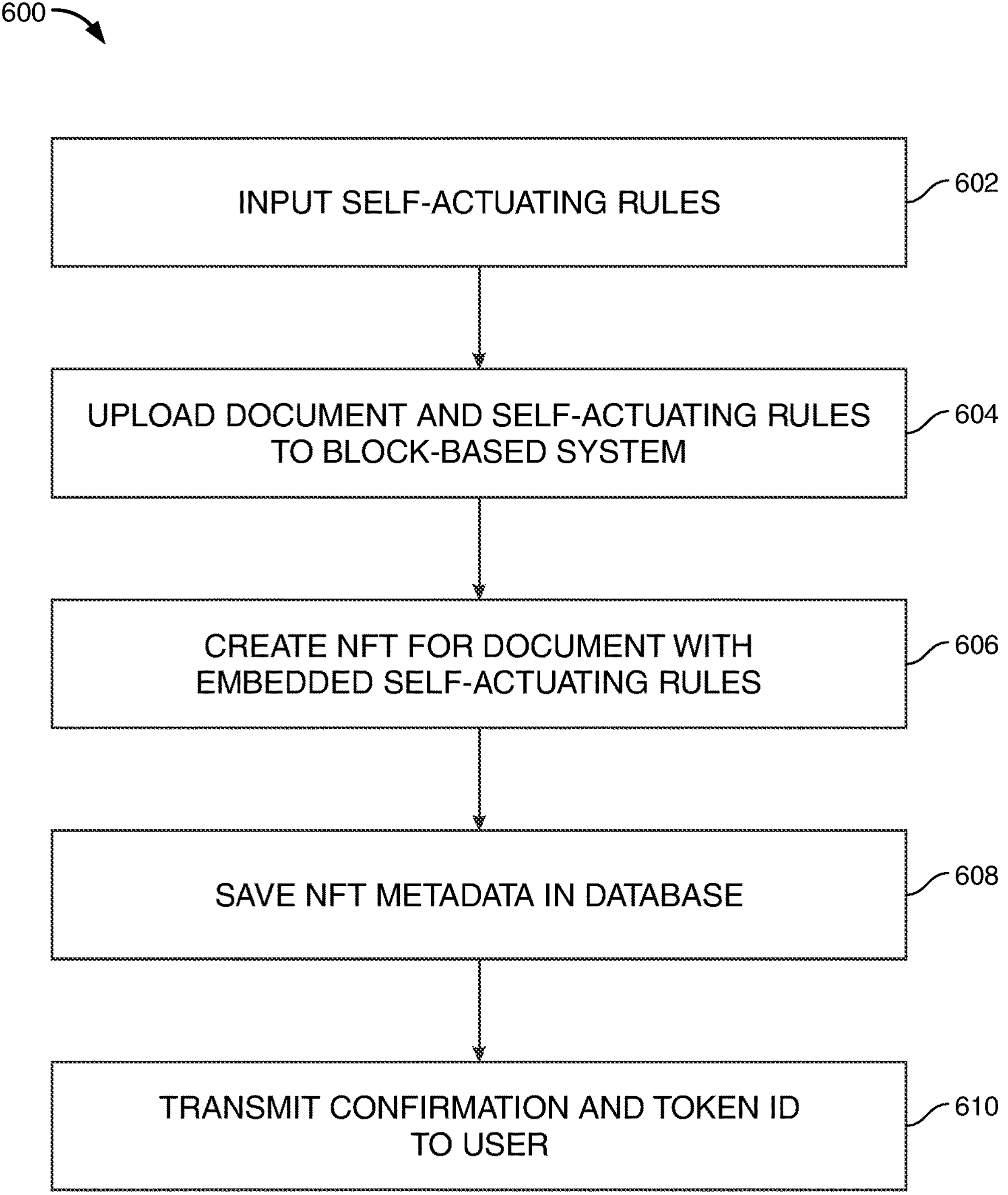
FIG. 6 shows an illustrative process flow in accordance with principles of the disclosure.

FIG. 6 shows process flow 600 for minting an NFT encoding self-actuating document management protocols. At step 602, a user may input self-actuating document management rules at a user interface. At step 604, the user may upload the document and the self-actuating rules to a block-based system, such as a private blockchain.

At step 606, the system may create an NFT for the document. The self-actuating rules may be embedded in the NFT. At step 608, the NFT metadata that encodes the self-actuating rules may be stored on the blockchain. At step 610, the system may transmit a confirmation and a token identifier to the user.

Thus, methods and apparatus for NFT-BASED INTELLIGENT DOCUMENT PROTOCOLS are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for NFT-based self-actuating document management, the method comprising, at a private blockchain network:

capturing a document;

capturing a set of document rules associated with the document, the document rules comprising a purge date, an entitlement criterion, and a set of redaction requirements;

converting the document text to a digital document format;

minting an NFT, the digital document format embedded in the NFT, the document rules encoded as self-actuating document rules in NFT metadata, the NFT having an interface and metadata linkage conforming to ERC721 standard, and comprising a digital token and smart contract logic governing token transfer;

encrypting the NFT and NFT metadata using public/private key encryption;

storing the NFT in a blockchain, the storing comprising generating a unique hash for the NFT and NFT metadata based on a position of the NFT in the blockchain;

transmitting the minted digital token to the document owner; and receiving modification of a document rule at a user interface and, in response, modifying the NFT metadata.

2. The method of claim 1, further comprising:

receiving a request from a user at the blockchain network to access the document; and requiring an entitlement criterion based on the self-actuating document rules encoded in the NFT metadata.

3. The method of claim 1, further comprising:

receiving a request from a user at the blockchain network to access the document; and redacting a portion of the document before displaying the document to the user based on the self-actuating document rules encoded in the NFT metadata.

4. The method of claim 1, further comprising, in response to reaching a predetermined calendar date, purging the document from the blockchain network based on the self-actuating document rules encoded in the NFT metadata.

5. The method of claim 1, further comprising encrypting the NFT and the NFT metadata using advanced encryption standard.

6. The method of claim 1, further comprising encrypting the NFT and the NFT metadata using a combination of symmetric and asymmetric encryption layers.

7. The method of claim 1, further comprising, receiving a selection of a self-actuating document rule at a user interface.

8. One or more non-transitory computer-readable media storing computer-executable instructions which, when executed by a processor on a computer system, perform a method for NFT-based intelligent document management, the method comprising, at a private blockchain network:

capturing a document;

capturing a set of rules associated with the document, the rules comprising a purge date, an entitlement criterion, and a set of redaction requirements;

converting the document to a digital document format;

minting an NFT, the digital document embedded in the NFT, the document rules encoded in self-actuating NFT metadata, the NFT having an interface and metadata linkage conforming to ERC721 standard, and comprising a digital token and smart contract logic governing token transfer;

encrypting the NFT and the NFT metadata using public/private key encryption;

storing the NFT in the blockchain, the storing comprising generating a unique hash for the NFT and NFT metadata based on a position of the NFT in the blockchain;

transmitting the minted digital token to the document owner; and receiving modification of a document rule at a user interface and, in response, modifying the NFT metadata.

9. The media of claim 8, further comprising, at a user interface:

receiving selection of a document rule; and receiving a request to mint an NFT comprising the selected document rule.

10. The media of claim 8, further comprising, at a user interface:

receiving modification of a selectable document rule; and receiving a request to mint an NFT comprising the modified document rule.

11. The media of claim 8, further comprising:

receiving a request from a user at the blockchain network to access the document; and requiring an entitlement criterion in accordance with the document rules encoded in the self-actuating NFT metadata.

12. The media of claim 8, further comprising:

receiving a request from a user at the blockchain network to access the document; and redacting a portion of the document before displaying the document to the user in accordance with the document rules encoded in the self-actuating NFT metadata.

13. The media of claim 8, further comprising, in response to reaching a predetermined calendar date, purging the document from the blockchain network in accordance with the document rules encoded in the self-actuating NFT metadata.

14. A system for NFT-based intelligent document protocols, the system comprising:

a user interface configured to receive input of a document and a set of document rules from a document owner;

a blockchain network configured to:

convert the document to a digital document format;

parse the document rules;

mint an NFT comprising smart contract logic, the digital document embedded in the NFT and the document rules encoded in self-actuating NFT metadata, the NFT having an interface and metadata linkage conforming to ERC721 standard, and comprising a digital token and smart contract logic;

encrypt the NFT and the NFT metadata;

store the NFT in the blockchain, the storing comprising generating a unique hash for the NFT and NFT metadata based on a position of the NFT in the blockchain;

transmit the minted digital token to the document owner; and receive modification of a document rule at a user interface and, in response, modify the NFT metadata.

15. The system of claim 14, the NFT and NFT metadata encrypted using public/private key encryption prior to generating the hash.

16. The system of claim 14, the NFT and the NFT metadata encrypted using a combination of symmetric and asymmetric encryption layers prior to generating the hash.

17. The system of claim 14, the blockchain network further configured to:

receive a request from a user to access the document; and require an entitlement criterion prior to access based on the document rules encoded in the self-actuating NFT metadata.

18. The system of claim 14, the blockchain network further configured to:

receive a request from a user to access the document; and redact a portion of the document before displaying the document to the user based on the document rules encoded in the self-actuating NFT metadata.

19. The system of claim 14, the blockchain network further configured to, in response to reaching a predetermined calendar date, purge the document from the blockchain network, based on the document rules encoded in the self-actuating NFT metadata.

* * * * *